(12) United States Patent
Wei Chang

(10) Patent No.: US 6,746,229 B2
(45) Date of Patent: Jun. 8, 2004

(54) SUPPORTING MECHANISM FOR PRESSURE THERMOFORMING MACHINE

(76) Inventor: Kuei-mei Wei Chang, No. 5, Alley 99, Lane 36, Sec. 3, Ta Kuan Rd., Panchiao City, Taipei Hsien (TW)

( * ) Notice: Subject to any disclaimer, the term of this patent is extended or adjusted under 35 U.S.C. 154(b) by 330 days.

(21) Appl. No.: 09/905,958

(22) Filed: Jul. 17, 2001

(65) Prior Publication Data

US 2003/0017228 A1 Jan. 23, 2003

(51) Int. Cl.[7] ............................................. B29C 33/20
(52) U.S. Cl. ...................... 425/193; 425/394; 425/423; 425/451.7; 425/DIG. 129
(58) Field of Search ................................. 425/193, 195, 425/355, 394, 408, 411, 415, 423, 451.7, 451.3, DIG. 129, DIG. 5

(56) References Cited

U.S. PATENT DOCUMENTS

| | | | | |
|---|---|---|---|---|
| 4,535,689 A | * | 8/1985 | Putkowski | ............... 425/451.7 |
| 5,731,014 A | * | 3/1998 | Travaglini | ................... 425/190 |
| 5,964,134 A | * | 10/1999 | Arends | ........................... 83/13 |

* cited by examiner

Primary Examiner—Robert Davis
Assistant Examiner—Thu Khanh T. Nguyen
(74) Attorney, Agent, or Firm—Rabin & Berdo, P.C.

(57) ABSTRACT

A pressure thermoforming machine comprises a lower bracket having a molding half moveably supported thereon. An upper bracket is securely connected to the lower bracket. An upper molding half is moveably supported thereon. Driving blocks are moveably and oppositely mounted on the lower bracket. Each driving block includes an inclined surface and the driving blocks are moveably interconnected such that the driving blocks move toward and away from each other simultaneously. Rollers are mounted on the lower molding half with respect to the inclined surface of the driving block such that the lower molding half moves upward when the driving blocks move toward each other, and lower downward when the driving blocks move away from each other.

5 Claims, 4 Drawing Sheets

SUPPORTING MECHANISM FOR PRESSURE THERMOFORMING MACHINE

FIELD OF THE INVENTION

The present invention relates to a supporting mechanism, and more particularly to a supporting mechanism for a pressure thermoforming machine.

DESCRIPTION OF THE PRIOR ART

As showing in FIG. 4, a conventional pressure thermoforming machine generally includes a lower bracket (b) and an upper bracket (a) corresponding to the lower bracket (b). A lower molding half (f) moveably driven by a lower cylinder (e) is mounted on the lower bracket (b); while an upper molding half (d) moveably driven by an upper cylinder (c) is mounted on the upper bracket (a). The upper and lower molding halves (d, f) are moved toward each other for forming an article therebetween, and moved away from each other for releasing the formed article therefrom.

Once the upper and lower molding halves (d, f) are closed, a molding cavity defined therebetween is undergone a vacuuming process such that a molten material can adequately flow to completely fill the cavity. In case of an asymmetric molding cavity, after the molten material filled in the cavity, an unbalanced situation of the lower molding half (f) will be encountered since the lower molding half (f) is simply supported by a piston of the lower cylinder (e). As a result, the unbalanced situation of the lower molding half (f) will cause separation of the upper and lower molding halves (d, f) such that the article formed therebetween will become defective, for example, a gap generated therefore will cause a variation of dimension of the article.

SUMMARY OF THE INVENTION

It is an object of this invention is to provide a supporting mechanism for a pressure thermoforming machine in which a lower molding half is adequately supported to prevent any unbalanced situation during molding process.

In order to achieve the object set forth, a pressure thermoforming machine in accordance with the present invention comprises a lower bracket having a molding half moveably supported thereon. An upper bracket is securely connected to the lower bracket. An upper molding half is moveably supported thereon. Driving blocks are moveably and oppositely mounted on the lower bracket. Each driving block includes an inclined surface and the driving blocks are moveably interconnected such that the driving blocks move toward and away from each other simultaneously. Rollers are mounted on the lower molding half with respect to the inclined surface of the driving block such that the lower molding half moves upward when the driving blocks move toward each other, and lower downward when the driving blocks move away from each other.

SUMMARY OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Figure 1:
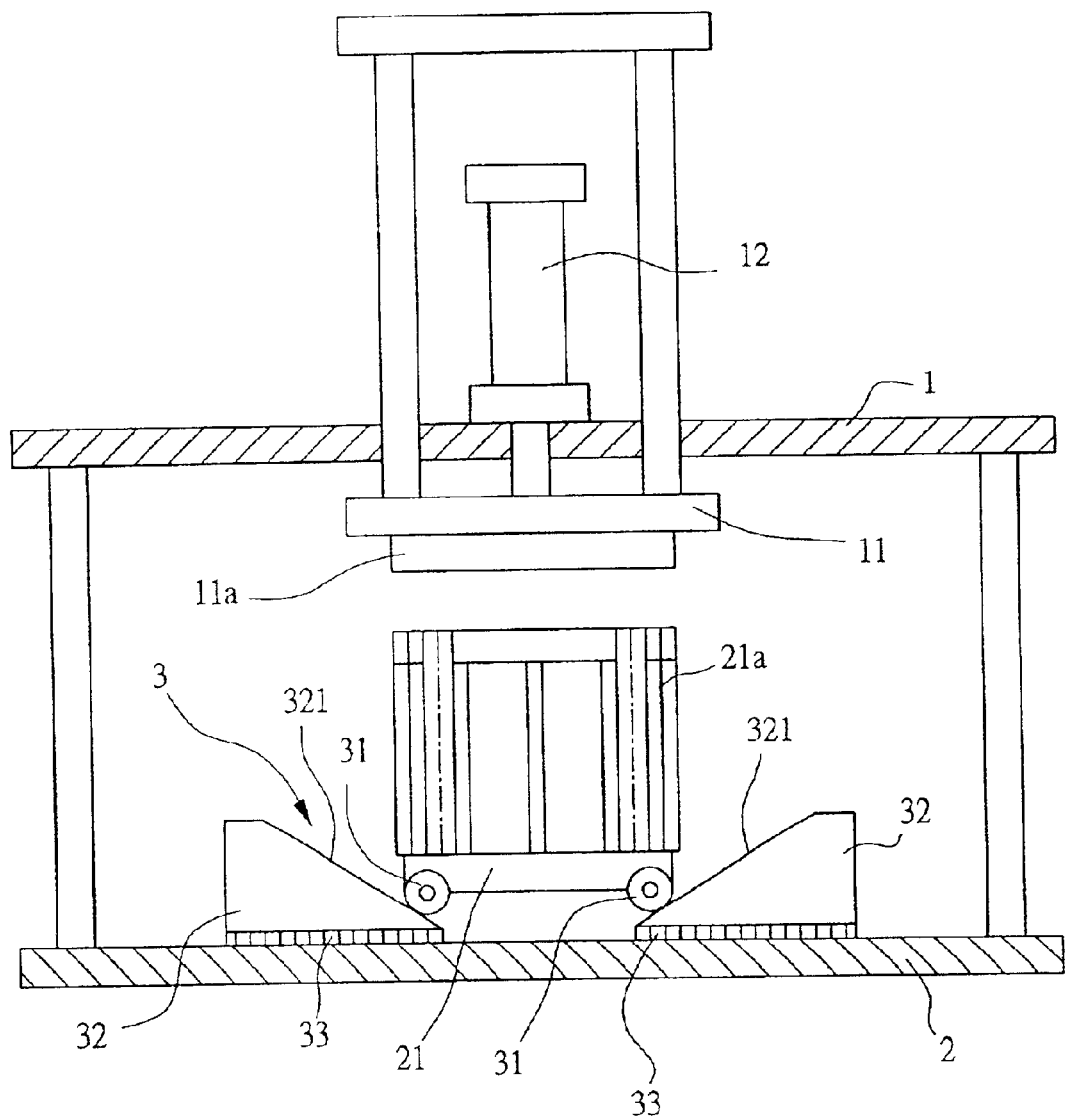
FIG. 1 is a side elevational view of a pressure thermoforming machine in accordance with the present invention.
Figure 2:
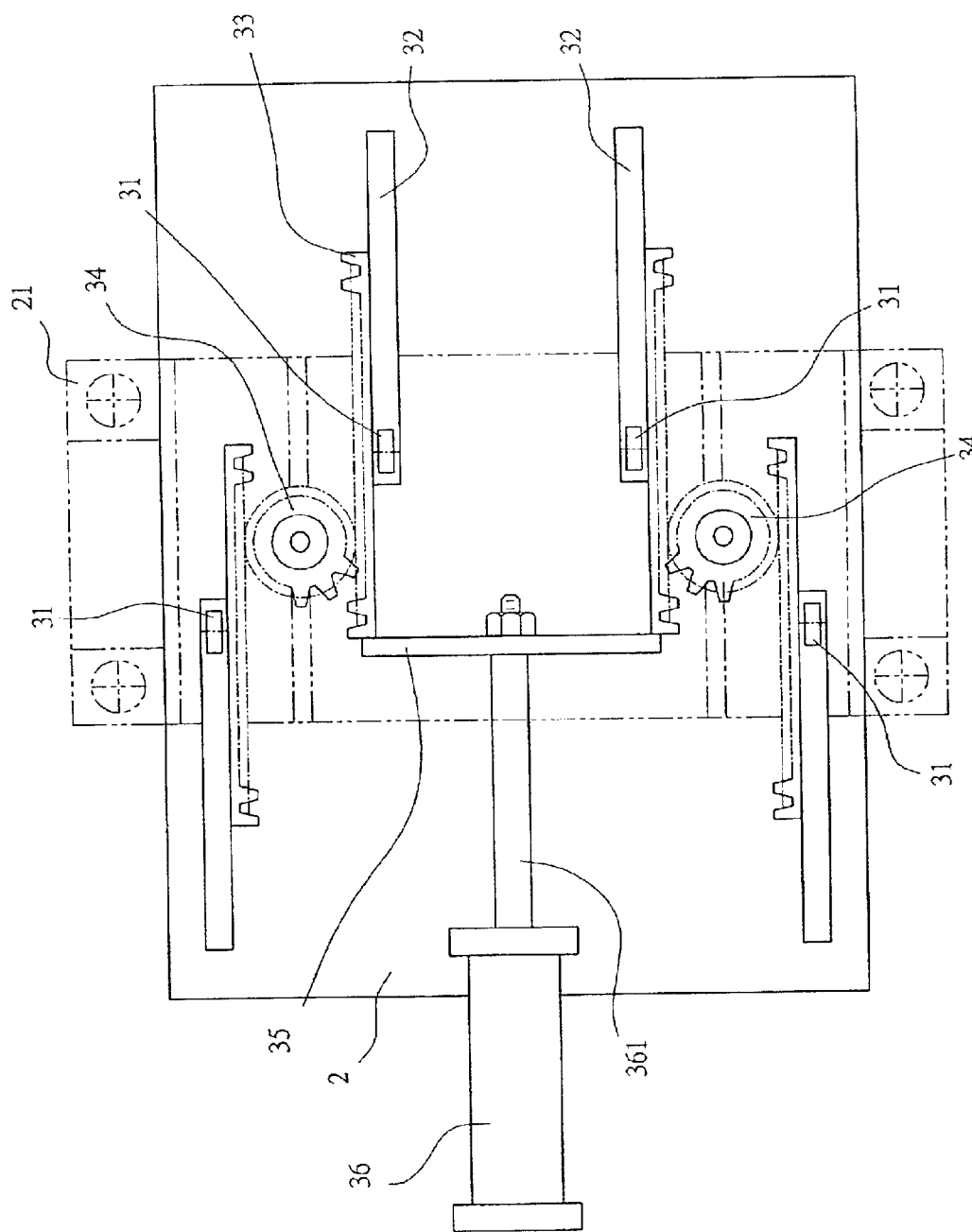
FIG. 2 is a top view of FIG. 1.
Figure 3:
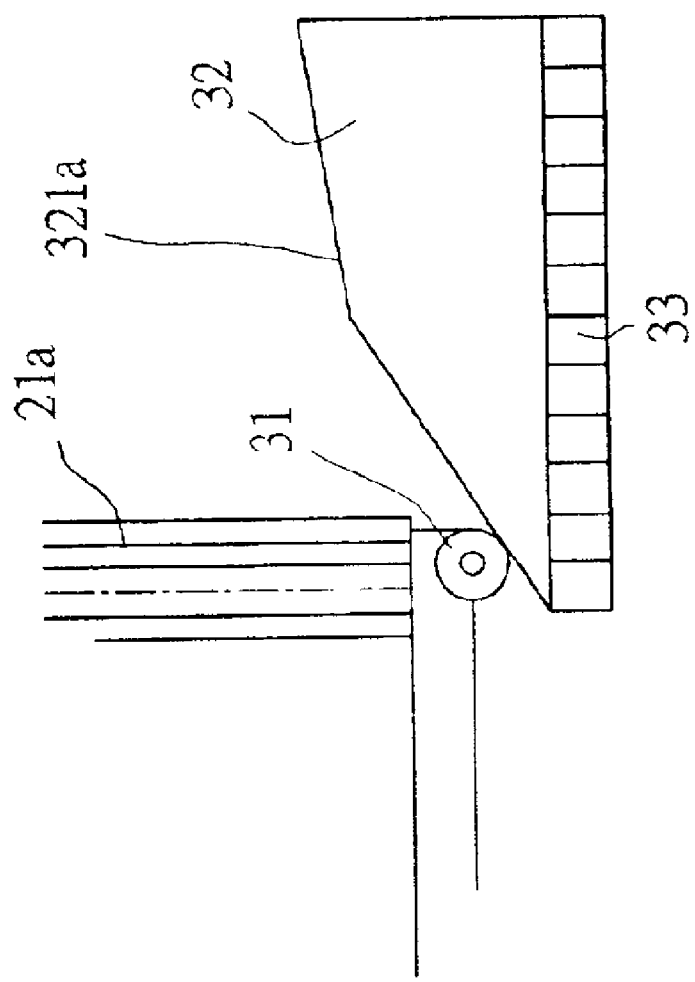
FIG. 3 is a driving block in accordance with a second embodiment of the present invention.
Figure 4:
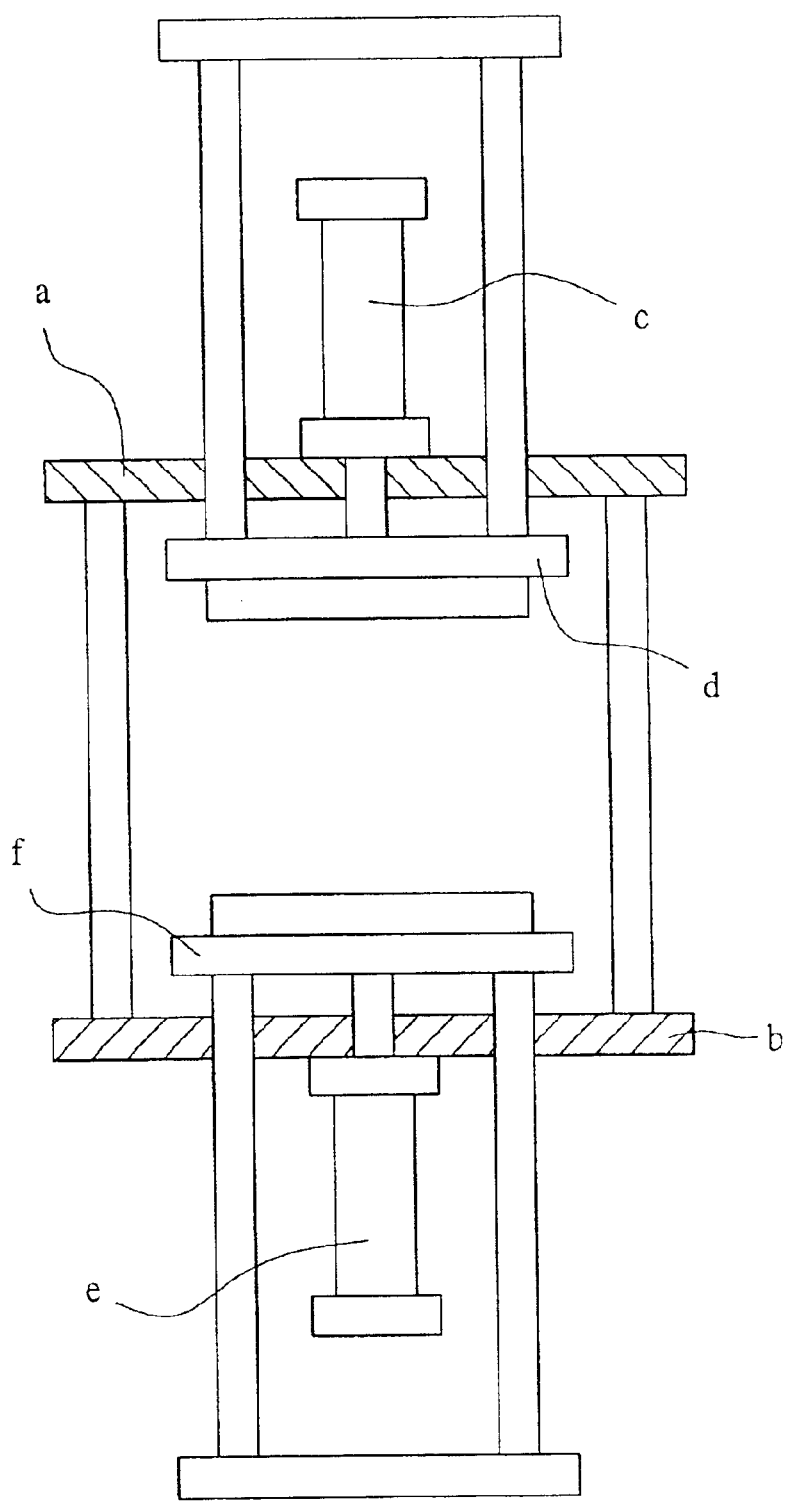
FIG. 4 is a side elevational view of a conventional pressure thermoforming machine.

Referring to FIGS. 1 to 3, a pressure thermoforming machine in accordance with the present invention includes an upper bracket 1 and a lower bracket 2. An upper molding half 11 is moveably mounted to the upper bracket 1, while a lower molding half 21 is moveably mounted on the lower bracket 2 by means of a supporting mechanism 3.

The supporting mechanism 3 includes four rollers 31 mounted on corners of the lower molding half 21. Each roller 31 rotationally supported on a driving block 32 moveably mounted on the lower bracket 2. Each driving block 32 is further provided with a rack 33 moveably conjugated with another driving rack by means of a gear 34. The another driving rack is then connected to a piston 361 of a cylinder 36.

There are a total of four driving blocks 32 mounted on the lower bracket 2, two on each side. As shown in FIG. 2, each driving block 32 is provided with a rack 33 on an inner wall thereof. In order o make those two driving blocks 32 to move simultaneously, the inner rack 33 of the driving block 32 is connected to a corresponding outer driving rack by means of a corresponding gear 34. The driving racks 33a are then connected to the piston 361 of the cylinder 36. By this arrangement, when the driving racks 33a are moved by the piston 361, the driving blocks 32 are moved simultaneously.

As described above, each side of the lower bracket 2 is provided with two driving blocks 32 which move toward and away from each other by the control of the piston 361 of the cylinder 36. When the opposite driving blocks 32 are moved toward each other by the actuation of the piston 361 of the cylinder 36, the lower molding half 21 is moved upward because inclined surfaces 321 of the driving block 32 move into a bottom of the lower molding half 21. From another point of view, if we take driving block 32 as being stationary without moving, it looks like the roller 31 climbs upward along the inclined surface 321. By the arrangement, when four driving blocks 32 are moved toward each other simultaneously, the lower molding half 21 is driven upward. To the contrary, when the driving blocks 32 move away from each other, the lower molding half 211 lowers down as the rollers 31 roll down along the inclined surface 321.

The upper molding half 11 is driving by a cylinder 12 to move toward and away the lower molding half 21.

Since the lower molding half 21 is adequately supported by the arrangement of the rollers 31 and the driving blocks 32, the lower molding half 21 is kept in a level position during upward and downward movements. In addition, since the lower molding half 21 is supported by its four corners, the lower half molding 21 can bear more of a downward load, especially when the molding cavity is designed asymmetrically. By this arrangement, the problem encountered by the prior art is completely solved. As a result, the upper and lower molding halves 11, 21 are correctly engaged during the molding process, and burrs due to a gap between halves 11, 21 are completely prevented.

In addition, since the lower molding half 21 is supported by the inclined surfaces 321 of the driving block 32, the driving power of the piston 36 can be also reduced thereby saving more electricity and reducing cost.

Referring to FIG. 3, the inclined surfaces 321 can be arrange in different inclined surfaces, each having different angles of inclination, thereby lifting up the lower molding half 21 in different speed.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A pressure thermoforming machine, comprising:

a lower bracket;

a lower molding half moveably supported on the lower bracket;

an upper bracket securely connected to the lower bracket;

an upper molding half moveably supported by said upper bracket; and supporting means arranged between the lower molding half and the lower bracket, and including first and second driving blocks, each said driving block having at least a first and a second inclined surface, with an angle of inclination of the first surface being different from an angle of inclination of the second surface, the first and second inclined surfaces of the first driving block being disposed to face the first and second inclined surfaces of the second driving block, the first and second driving blocks being relatively movable toward and away from each other, the lower molding half being supported by the inclined surfaces of said driving blocks to prevent any unbalancing during a molding process, and so that the lower molding half moves upward when the driving blocks move toward each other, and moves downward when the driving blocks move away from each other;

and wherein the lower molding half moves upward and downward more quickly when it is disposed on the first inclined surfaces than when it is disposed on the second inclined surfaces.

2. The pressure thermoforming machine as recited in claim 1, wherein the supporting means includes rollers securely attached to the lower molding half, and which roll up and down the inclined surfaces.

3. The pressure thermoforming machine as recited in claim 1, wherein the driving blocks are moveably connected to move simultaneously toward and away from each other.

4. A pressure thermoforming machine, comprising:

a lower bracket;

a lower molding half moveably supported on the lower bracket;

an upper bracket connected to the lower bracket;

an upper molding half moveably supported by the upper bracket; and supporting means arranged between the lower molding half and the lower bracket, and including a pair of oppositely disposed driving blocks on the lower bracket, the driving blocks being moveably connected to move simultaneously toward and away from each other, the lower molding half being supported by the driving blocks to prevent any unbalancing during a molding process, wherein the driving blocks are connected by a rack and gear to move simultaneously to push the lower molding half upward when the driving blocks move toward each other and lower the lower molding half down when the driving blocks move away from each other.

5. A pressure thermoforming machine, comprising:

a lower bracket;

a lower molding half moveably supported on the lower bracket;

an upper bracket connected to the lower bracket;

an upper molding half moveably supported by the upper bracket;

driving blocks moveably and oppositely mounted on the lower bracket, each driving block including an inclined surface, the driving blocks being moveably interconnected such that the driving blocks move toward and away from each other simultaneously; and rollers mounted on the lower molding half and supported by the inclined surfaces of the driving blocks such that the lower molding half moves upward when the driving blocks move toward each other, and moves downward when the driving blocks move away from each other;

wherein the driving blocks are interconnected by racks and gears such that the driving blocks move simultaneously.

* * * * *